(12) United States Patent
Cammy et al.

(10) Patent No.: US 6,835,302 B2
(45) Date of Patent: Dec. 28, 2004

(54) FCC PROCESS AND APPARATUS WITH AUTOMATIC CATALYST RECYCLE CONTROL

(75) Inventors: Neal E. Cammy, Roselle, IL (US); Ricardo Castillo, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 672 days.

(21) Appl. No.: 09/816,510

(22) Filed: Mar. 23, 2001

(65) Prior Publication Data

US 2003/0223918 A1 Dec. 4, 2003

(51) Int. Cl.[7] ............................................. C10G 11/00
(52) U.S. Cl. .................................. 208/113; 208/DIG. 1
(58) Field of Search ........................... 208/113, DIG. 1

(56) References Cited

U.S. PATENT DOCUMENTS

| | | | |
|---|---|---|---|
| 2,743,998 A | 5/1956 | Swart et al. .................... 23/288 |
| 2,965,454 A | 12/1960 | Harper .......................... 23/288 |
| 3,591,783 A | 7/1971 | Zumwalt ................ 235/151.12 |
| 3,888,762 A * | 6/1975 | Gerhold .................. 208/120.01 |
| 3,964,876 A | 6/1976 | James ........................ 23/288 S |
| 4,092,722 A * | 5/1978 | Hofferber et al. ............ 700/273 |
| 4,220,622 A | 9/1980 | Kelley .......................... 422/109 |
| 4,234,411 A | 11/1980 | Thompson .................... 208/74 |
| 5,451,313 A | 9/1995 | Wegerer et al. ............. 208/164 |
| 5,858,207 A * | 1/1999 | Lomas ........................ 208/113 |
| 5,965,012 A | 10/1999 | Lomas ........................ 208/113 |
| 6,143,253 A | 11/2000 | Radcliffe et al. ............ 422/145 |
| 6,183,699 B1 | 2/2001 | Lomas ........................ 422/145 |
| 6,508,930 B1 * | 1/2003 | Evans et al. ................. 208/113 |
| 6,538,169 B1 * | 3/2003 | Pittman et al. .............. 585/653 |

* cited by examiner

*Primary Examiner*—Walter D. Griffin
(74) *Attorney, Agent, or Firm*—John G. Tolomei; James C. Paschall

(57) ABSTRACT

An FCC process and apparatus that blends spent and regenerated catalyst before the catalyst contacts the feed in a reaction zone. The circulation rate of spent catalyst is automatically controlled based on a circulation rate of regenerated catalyst.

9 Claims, 1 Drawing Sheet

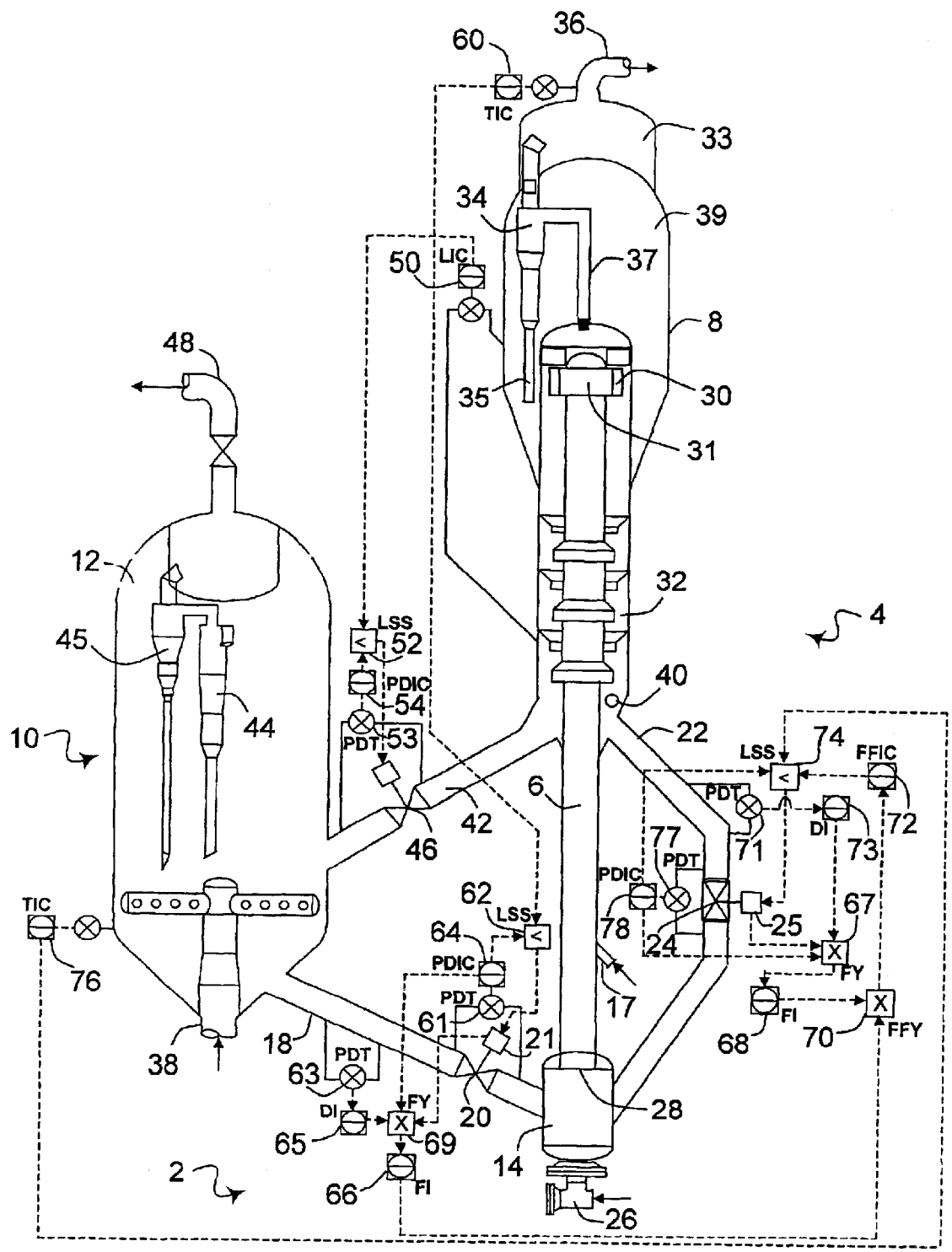

FCC PROCESS AND APPARATUS WITH AUTOMATIC CATALYST RECYCLE CONTROL

FIELD OF THE INVENTION

This invention relates to a fluidized catalytic cracking (FCC) process and apparatus in which spent catalyst particles are sent to a regenerator before being sent back to a reaction zone while other catalyst particles are recycled back to the cracking zone without regeneration. Specifically, this invention relates to controlling the circulation rate of unregenerated, spent catalyst recycled back to the reaction zone.

DESCRIPTION OF THE PRIOR ART

Catalytic cracking is accomplished by contacting hydrocarbons in a reaction zone with a catalyst composed of finely divided particulate material. As the cracking reaction proceeds, substantial amounts of coke are deposited on the catalyst. A high temperature regenerator within a regeneration zone operation burns coke from the catalyst. Coke-containing catalyst, referred to generally by those skilled in the art as spent catalyst, is continually removed from the reaction zone and replaced by essentially coke-free catalyst from the regeneration zone. Fluidization of the catalyst particles by various gaseous streams facilitates the transport of catalyst between the reaction zone and regeneration zone. Methods for cracking hydrocarbons in a fluidized stream of catalyst, transporting catalyst between reaction and regeneration zones, and combusting coke in the regenerator are well known by those skilled in the art of FCC processes. To this end, the art is replete with vessel configurations for contacting catalyst particles with feed and regeneration gas, respectively.

One such configuration is disclosed in U.S. Pat. No. 5,451,313 B1 in which a portion of the spent catalyst is stripped and sent to the regeneration zone where it is regenerated and sent to a mixing vessel at the base of the riser and another portion of the spent catalyst is sent from the stripping vessel to the mixing vessel at the base of the riser without undergoing regeneration. The cooler spent catalyst mixes with the hotter regenerated catalyst to produce a lower overall temperature of the catalyst contacting the feed. This configuration reduces the localized overheating of the feed or the severity of the feed heating caused by the large temperature differentials between the feed and the catalyst which both contribute to feed overcracking.

In FCC systems, spent catalyst is typically sent from the base of the stripping vessel to the regenerator through a spent catalyst conduit. Regenerated catalyst is passed from the regenerator vessel through a regenerated catalyst conduit to the base of the reaction zone. The circulation rate of the spent catalyst through the spent catalyst conduit is maintained by a spent catalyst control valve, and the circulation rate of the catalyst through the regenerated catalyst conduit is maintained by a regenerated catalyst control valve. Spent catalyst that will not undergo regeneration is recycled either from the separator vessel or, specifically, the stripping vessel to the base of the riser by a recycled catalyst conduit. A recycled catalyst control valve regulates the recycled catalyst circulation rate. The respective catalyst circulation rate through the spent catalyst control valve, the regenerated catalyst control valve and the recycled catalyst control valve is approximated using the density in the respective catalyst conduit, the differential pressure across the control valve and the position of the control valve relative to fully opened.

The spent catalyst control valve automatically controls the circulation rate of spent catalyst from the separator vessel to the regenerator to maintain a constant catalyst level in the separator. The regenerated catalyst control valve to maintain a constant temperature of the separator vessel automatically controls the circulation rate of hot regenerated catalyst from the regenerator to the riser. The controls that operate each of the spent catalyst and regenerated catalyst control valves also include a low differential pressure override. If the differential pressure across either slide valve drops to a very low or negative value, the override will close the control valve. This minimizes the possibility of reverse flow in the conduits, either air entering the separator vessel or feed entering the regenerator, which are hazardous situations.

No direct measured variable has been used to control the recycled catalyst circulation rate through the recycled catalyst control valve. Therefore, an automatic control is needed, so the operator does not have to adjust the spent catalyst circulation rate based on a change in the feed rate or the regenerated catalyst circulation rate.

U.S. Pat. Nos. 2,743,998 B1, 3,591,783 B1, 3,964,876 B1, 4,220,622 B1 and 4,234,411 B1 all disclose FCC systems with automatic controls for regulating the FCC process. However, none of these references pertains to recycling spent catalyst to the reaction zone without undergoing regeneration or a means for controlling the circulation rate of such spent catalyst. Accordingly, it is an object of this invention to provide a means for automatically controlling the circulation rate of spent catalyst to the reaction zone without undergoing regeneration.

SUMMARY OF THE INVENTION

In one embodiment, the present invention relates to an apparatus for the fluidized catalytic cracking of hydrocarbons The apparatus comprises a reaction zone in which blended catalyst is contacted with a hydrocarbon feed. A separator vessel receives effluent from the reaction zone and separates the effluent into a vapor product and spent catalyst. A recycled catalyst conduit communicative with the separator vessel passes spent catalyst to the reaction zone. The recycled catalyst conduit includes a recycled catalyst control valve for regulating spent catalyst circulation and instrumentation for determining the circulation rate of spent catalyst through the recycled catalyst conduit. A regeneration zone removes carbon from the spent catalyst to provide regenerated catalyst. A spent catalyst conduit communicative between the separator vessel and the regeneration zone passes spent catalyst to the regeneration zone. A regenerated catalyst conduit communicative between the regeneration zone and the reaction zone passes regenerated catalyst from the regeneration zone to the reaction zone. The regenerated catalyst is blended with the spent catalyst in the reaction zone to provide the blended catalyst The regenerated catalyst conduit includes instrumentation for determining the circulation rate of regenerated catalyst through the regenerated catalyst conduit. A recycled catalyst controller sets a position of the recycled catalyst control valve dependent on whether a relationship between the circulation rate of spent catalyst through the recycled catalyst conduit and the circulation rate of regenerated catalyst through the regenerated catalyst conduit meets a preset condition.

In a further embodiment, the relationship between the circulation rate of spent catalyst through the recycled catalyst conduit and the circulation rate of regenerated catalyst through the regenerated catalyst conduit is the ratio of a sum of the circulation rate of spent catalyst through the recycled catalyst conduit and the circulation rate of regenerated catalyst through the regenerated catalyst conduit to the circulation rate of regenerated catalyst through the regenerated catalyst conduit.

In another embodiment, the present invention relates to an apparatus for the fluidized catalytic cracking of hydrocarbons that comprises a riser in which blended catalyst is contacted with a hydrocarbon feed. A separator vessel receives effluent from the riser and separates the effluent into a vapor product and spent catalyst. A recycled catalyst conduit communicative with the separator vessel passes spent catalyst to a base of the riser. The recycled catalyst conduit includes a recycled catalyst control valve for regulating spent catalyst circulation and instrumentation for determining the circulation rate of spent catalyst through the recycled catalyst conduit. A regenerator vessel removes hydrocarbons from the spent catalyst to provide regenerated catalyst. A spent catalyst conduit communicative between the separator vessel and the regenerator vessel passes spent catalyst to the regenerator vessel. A regenerated catalyst conduit communicative between the regenerator vessel and the base of the riser passes regenerated catalyst from the regenerator vessel to the base of the riser. The regenerated catalyst is blended with the spent catalyst to provide the blended catalyst in the riser. The regenerated catalyst conduit includes instrumentation for determining the circulation rate of regenerated catalyst through the regenerated catalyst conduit. A recycled catalyst controller sets a position of the recycled catalyst control valve dependent on whether a relationship between the circulation rate of spent catalyst through the recycled catalyst conduit and the circulation rate of regenerated catalyst through the regenerated catalyst conduit meets a preset condition.

In a further embodiment, the present invention relates to a process for the fluidized catalytic cracking of hydrocarbons. The process comprises contacting blended catalyst with a hydrocarbon feed in a reaction zone. The effluent is separated from the reaction zone into vapor product and spent catalyst. The spent catalyst is recycled to the reaction zone. A recycled catalyst control valve regulates circulation of the spent catalyst. A circulation rate of spent catalyst to the reaction zone is determined. The spent catalyst is passed from the reaction zone to a regeneration zone. Hydrocarbons are removed from the spent catalyst in the regeneration zone to provide regenerated catalyst. The regenerated catalyst is passed from the regeneration zone to the reaction zone, and a circulation rate of regenerated catalyst from the regeneration zone to the reaction zone is determined. The regenerated catalyst is blended with the spent catalyst in the reaction zone to provide the blended catalyst. An adjusted setting is signaled to the recycled catalyst control valve if a relationship between the circulation rate of spent catalyst to the reaction zone and the circulation rate of regenerated catalyst to the reaction zone does not meet a preset condition.

In a still further embodiment, the relationship between the circulation rate of spent catalyst and the circulation rate of regenerated catalyst is the ratio of a sum of the circulation rate of spent catalyst and the circulation rate of regenerated catalyst to the circulation rate of regenerated catalyst.

Additional objects, embodiments, and details of this invention will become apparent from the following detailed description.

BRIEF DESCRIPTION OF THE DRAWING

The FIGURE is an elevational schematic view showing an FCC unit in accordance with this invention.

DETAILED DESCRIPTION OF THE INVENTION

This invention is associated with an FCC process. The FIGURE shows a typical schematic arrangement of an FCC unit 2 arranged in accordance with this invention. The description of this invention in the context of the specific process arrangement shown is not meant to limit it to the details disclosed therein. The FCC unit 2 shown in the FIGURE consists of a reaction zone 4 comprising an elongate riser 6 and a separator vessel 8, and a regeneration zone 10 comprising a regenerator 12. The arrangement circulates catalyst and contacts feed in the manner hereinafter described.

The catalyst that enters the riser 6 can include any of the well-known catalysts that are used in the art of fluidized catalytic cracking. These compositions include amorphous-clay type catalysts or high activity, crystalline alumina silica or zeolite containing catalysts.

FCC feedstocks, suitable for processing by the method of this invention, include conventional FCC feeds and higher boiling or residual feeds. The most common of the conventional feeds is a vacuum gas oil which is typically a hydrocarbon material having a boiling range of from 650° to 1025° F. (343° to 552° C.) and is prepared by vacuum fractionation of atmospheric residue.

Riser 6 is one type of conversion vessel that can be used in conjunction with this invention. The riser type conversion vessel comprises a conduit for the pneumatic conveyance of the blended catalyst mixture and the feed stream. The base of the riser 6 may include a blending vessel 14.

Feed is introduced into the riser 6 somewhere between inlet 28 and substantially upstream from an outlet 30. The feed enters by nozzle 17 in the FIGURE, usually in a lower portion of the riser 6. Before contacting the catalyst, the feed will ordinarily have a temperature in a range of from 300° to 600° F. (149° to 316° C.). Additional amounts of feed may be added downstream of the initial feed point.

A regenerated catalyst conduit 18 passes regenerated catalyst from the regenerator 12 into the blending vessel 14 at a circulation rate regulated by a control valve such as slide valve 20. A recycled catalyst conduit 22 passes catalyst from separator vessel 8 at a circulation rate regulated by a control valve such as slide valve 24 into blending vessel 14. Fluidizing gas passed into blending vessel 14 by a nozzle 26 contacts the catalyst and maintains the catalyst in a fluidized state to mix the recycled catalyst and regenerated catalyst.

The regenerated catalyst will have a substantially higher temperature than the recycled catalyst. Regenerated catalyst from the regenerated catalyst conduit 18 will usually have a temperature in a range from 1100° to 1400° F. (593° to 760° C.) and, more typically, in a range of from 1200° to 1400° F. (649° to 760° C.). The temperature of the recycled catalyst will usually be in a range of from 900° to 1150° F. (482° to 621° C.) The relative proportions of the recycled catalyst and regenerated catalyst will determine the temperature of the blended catalyst mixture that contacts the feed. The blended catalyst mixture will usually range from about 1000° to 1400° F. (538° to 760° C.) and more preferably is in a range of from 1050° to 1250° F. (566° to 677° C.). Ordinarily, the ratio of recycled catalyst to regenerated catalyst entering the blending zone will be in a broad range of from 0.1 to 5 and more typically in a range of from 0.5 to 1.0. Once the blended catalyst mixture contacts the feed, the blended catalyst mixture cracks the feed to smaller molecules.

The separator vessel 8 typically includes a stripping vessel 32. The blended catalyst mixture and reacted feed vapors are then discharged from the end of riser 6 through an outlet 30 into the stripping vessel 32 of the separator vessel 8. A swirl arm arrangement 31, provided at the end of riser 6 imparts a tangential velocity to the exiting catalyst and converted feed mixture to separate a product vapor stream from a collection of catalyst particles covered with substantial quantities of coke and generally referred to as "spent catalyst".

Direct conduit 37 passes a product vapor stream to a cyclone separator 34 in a primary chamber 39 of the separator vessel 8. The cyclone separator 34 further removes catalyst particles from the product vapor stream to reduce particle concentrations to very low levels. Product vapors comprising cracked hydrocarbons and some catalyst exit the top of separator vessel 8 through conduit 36 via plenum chamber 33. Catalyst separated by cyclone separator 34 returns to the separator vessel 8 through dipleg conduits 35 into a dense catalyst bed (not shown).

Catalyst drops through the stripping vessel 32 that removes adsorbed hydrocarbons from the surface of the catalyst by counter-current contact with steam. Steam enters the stripping vessel 32 through at least one line 40.

Spent catalyst stripped of hydrocarbon vapor leave the bottom of stripping vessel 32 through a spent catalyst conduit 42 at a rate regulated by a control valve such as slide valve 46. Spent catalyst for recycled to the base of the riser 6 may be withdrawn from the separator vessel 8 or even riser 6 after the spent catalyst has undergone a sufficient reduction in temperature Spent catalyst is most typically withdrawn downstream of the riser 6 and, more typically, from the stripping vessel 32. The FIGURE depicts the withdrawal of spent catalyst from a lower portion of the stripping vessel 32. A recycled catalyst conduit 22 transfers one portion of the spent catalyst exiting the separator vessel 8 back to the blending vessel 14 as recycled catalyst. A spent catalyst conduit 42 transfers another portion of the spent catalyst to the regenerator 12 for the removal of coke in the regeneration zone 10.

On the regeneration side of the process, spent catalyst transferred to the regenerator 12 via spent catalyst conduit 42 undergoes the typical combustion of coke from the surface of the catalyst particles by contact with an oxygen-containing gas. The oxygen-containing gas enters the bottom of the regenerator 12 via an inlet 38 and passes through a dense fluidizing bed of catalyst (not shown). Flue gas consisting primarily of CO or $CO_2$ passes upward from the dense bed into a dilute phase of regenerator 12. A separator, such as the cyclones 44 and 45, remove entrained catalyst particles from the rising flue gas before the flue gas exits the vessel through an outlet 48. Combustion of coke from the catalyst particles raises the temperatures of the catalyst to those previously described. The regenerated catalyst is transferred by regenerated catalyst conduit 18 to the base of the riser 6 in reaction zone 4.

The circulation rate of spent catalyst from the separator vessel 8 to the regenerator 12 through the spent catalyst conduit 42 is regulated by the slide valve 46, and the circulation rate of regenerated catalyst from the regenerator 12 to the base of the riser 6 is controlled by the slide valve 20. The circulation rate of spent catalyst from the stripping vessel 32 of the separator vessel 8 through the recycled catalyst conduit 22 is regulated by the slide valve 24. Slide valves 20, 24 and 46 have a setting that corresponds to a position of the slide valve relative to a fully opened valve.

The spent catalyst slide valve 46 is automatically controlled A level indicating controller (LIC) 50 receives a signal of the levels of the catalyst in the primary chamber 39 and in the stripping vessel 32 of the separator vessel 8. The LIC 50 signals to a low signal selector (LSS) 52 a setting for the spent catalyst slide valve 46 relative to fully open to bring the respective levels in the separator vessel 8 and in the stripping vessel 32 to the desired preset levels. A pressure differential transmitter (PDT) 53 senses and determines a differential pressure across spent catalyst slide valve 46 and signals a pressure differential to pressure differential indicating controller (PDIC) 54. The PDIC 54 signals a setting for the spent catalyst slide valve to the LSS 52. If the differential pressure across the spent catalyst slide valve 46 is greater than an override setpoint, typically 2 lbs/in² (0.14 kg/cm²), the LSS 52 will select and signal the slide valve 46 to adjust to the setting from the LIC 50. Nevertheless, the LSS 52 will send the lowest setting to the spent catalyst slide valve 46.

The regenerated catalyst slide valve 20 is also automatically controlled. A pressure differential transmitter (PDT) 61 senses and determines a pressure differential across the regenerated catalyst slide valve 20. The PDT signals the pressure differential to the pressure differential indicating controller 64 (PDIC) which signals a setting to a low signal selector (LSS) 62. A temperature indicating controller (TIC) 60 receives a temperature signal of the effluent gas from the separator vessel 8 in conduit 36, and signals a setting to the LSS 62 designed to open or close the slide valve 20 to effect the preset temperature desired in the separator vessel 8. If the differential pressure across the slide valve 20 is greater than an override setpoint, typically 2 lbs/in² (0.14 kg/cm²), the LSS 62 will select and signal the slide valve 20 to adjust to the setting signaled from the TIC 60. Again, the LSS 62 will signal the lowest setting to the regenerated catalyst slide valve 20.

The regenerated catalyst conduit 18 and the recycled catalyst conduit 22 include instrumentation to determine the circulation rate through the respective slide valves 20 and 24. It should be understood that the determinations of the circulation rates are not precise, but they are sufficient for the purpose of controlling operation of the FCC unit 2. The circulation rate is determined by a formulation of the density of the recycled catalyst stream, the position of the respective slide valve relative to fully open as indicated by the setting thereof and the differential pressure across the respective slide valve.

The instrumentation for determining the circulation rate of regenerated catalyst through the regenerated catalyst slide valve 20 includes the following. Density in the regenerated catalyst conduit 18 is determined by density indicator (DI) 65 which factors readings from a pressure differential transmitter (PDT) 63 with connections placed at different heights along the regenerated catalyst conduit 18 upstream of the regenerated catalyst slide valve 20. The pressure differential across the slide valve 20 is determined by a signal from a pressure differential transmitter (PDT) 61 with connections placed upstream and downstream of the slide valve 20. The PDT 61 signals the pressure differential to a pressure differential indicating controller (PDIC) 64. The DI 65 signals a density value, the PDIC 64 signals a pressure differential value and the actuator 21 signals a value for the setting of the slide valve 20 all to a flow computer (FY) 69. The FY 69 determines the flow rate of the regenerated catalyst based on the density, pressure differential and valve setting signals received and transmits the regenerated catalyst circulation rate to the a flow indicator (FI) 66. The FI 66 signals the determined regenerated catalyst circulation rate to a flow fraction computer (FFY) 70.

The instrumentation for determining the circulation rate of spent catalyst through the recycled catalyst slide valve 24 includes the following. Density in the recycled catalyst conduit 22 is determined by density indicator (DI) 73 which factors readings from a pressure differential transmitter (PDT) 71 with connections placed at different heights along the recycled catalyst conduit 22 upstream of the recycled catalyst slide valve 24. The pressure differential across the slide valve 24 is determined by a signal from a pressure differential transmitter (PDT) 77 with connections placed upstream and downstream of the slide valve 24. The PDT 77 signals the pressure differential to a pressure differential indicating controller (PDIC) 78. The DI 73 signals a density value, the PDIC 78 signals a pressure differential value and the actuator 25 signals a value for the setting of the slide valve 24 all to a flow computer (FY) 67. The FY 67 determines the flow rate of the recycled catalyst based on the density, pressure differential and valve setting signals received and transmits the recycled catalyst circulation rate to the a flow indicator (FI) 68. The FI 68 signals the determined recycled catalyst circulation rate to the FFY 70.

The spent catalyst conduit 42 may include similar instrumentation for determination of the spent catalyst circulation rate but it is not necessary for purposes of the invention.

The FFY 70 determines a process variable based on a relationship between the circulation rate of spent catalyst through the recycled catalyst conduit 22 and the circulation rate of regenerated catalyst through the regenerated catalyst conduit 18. It is preferred that this relationship be a ratio of a sum of the regenerated catalyst circulation rate and the spent catalyst circulation rate to the regenerated catalyst circulation rate:

$$\text{Process Variable} = \frac{\text{Regenerated Catalyst Circulation Rate} + \text{Recycled Catalyst Circulation Rate}}{\text{Regenerated Catalyst Circulation Rate}}$$

The FFY 70 determines the process variable and signals an outputted process variable to a flow fraction indicating controller (FFIC) 72 which compares the process variable to a preset value. If there is a difference between the actual process variable and the preset value, then the FFIC 72 signals to a low signal selector (LSS) 74 a setting to which the slide valve 24 should be positioned to return the process variable to the preset value. The LSS 74 also receives output settings for the slide valve 24 from a temperature indicating controller (TIC) 76 that monitors the temperature of the regeneration zone 10 and the pressure differential indicating controller (PDIC) 78 that monitors the differential pressure across the slide valve 24. The LSS 74 selects the lowest setting of the position of the slide valve relative to fully open and will signal this lowest setting to the actuator 25 for slide valve 24. Because the TIC 76 and the PDIC 78 are overrides, they will typically only signal settings of 100% open to the LSS 74. Hence, the setting signaled by the FFIC 72 will typically control the setting of the slide valve 24. However, if the regenerator temperature exceeds the predetermined override setpoint, typically 1350° F. (732° C.) or the differential pressure across the slide valve 24 is less than or equal to the override setpoint, typically 2 lbs/in$^2$ (0.14 kg/cm$^2$), the respective indicating controller will signal a setting of the position of the slide valve 24 which is less than 100% fully open. Again, this LSS 74 will select the lowest setting and output that lowest setting to the actuator 25 for slide valve 24.

The slide valve 24 may be controlled automatically based on a relationship between the circulation rate of the recycled catalyst and the regenerated catalyst. The LSS 74, and the TIC 76 and PDIC 78 overrides enhance the control of the slide valve 24 but are not necessary features.

What is claimed is:

1. A process for the fluidized catalytic cracking of hydrocarbons, the process comprising:

contacting blended catalyst with a hydrocarbon feed in a reaction zone;

separating effluent from said reaction zone into vapor product and spent catalyst;

recycling spent catalyst to said reaction zone;

regulating circulation of said spent catalyst with a recycled catalyst control valve;

determining a circulation rate of spent catalyst to said reaction zone;

passing spent catalyst from said reaction zone to a regeneration zone;

removing carbon from said spent catalyst in said regeneration zone to provide regenerated catalyst;

passing regenerated catalyst from said regeneration zone to said reaction zone;

determining a circulation rate of regenerated catalyst from said regeneration zone to said reaction zone;

blending said regenerated catalyst with said spent catalyst in said reaction zone to provide said blended catalyst;

determining whether a relationship between the circulation rate of spent catalyst to said reaction zone and the circulation rate of regenerated catalyst to said reaction zone meets a preset condition; and signaling an adjusted setting to the recycled catalyst control valve if said relationship between the circulation rate of spent catalyst and the circulation rate of regenerated catalyst does not meet the preset condition.

2. The process of claim 1 wherein the relationship between the circulation rate of spent catalyst and the circulation rate of regenerated catalyst is the ratio of a sum of the circulation rate of spent catalyst and the circulation rate of regenerated catalyst to the circulation rate of regenerated catalyst.

3. The process of claim 1 including regulating circulation of regenerated catalyst with a regenerated catalyst control valve.

4. The process of claim 1 wherein said recycled catalyst and said regenerated catalyst are blended at the base of a riser in said reaction zone.

5. The process of claim 1 wherein said spent catalyst is stripped of hydrocarbons before being passed to said regeneration zone or recycled to said reaction zone.

6. The process of claim 1 including setting the position of the control valve relative to fully open.

7. The process of claim 1 including selecting a lowest setting of a signal from a recycle catalyst controller based on the relationship between the circulation rate of spent catalyst and the circulation rate of regenerated catalyst and a signal from at least another controller, and signaling said lowest setting to said recycle catalyst control valve.

8. The process of claim 7 wherein said another controller is selected from a pressure differential indicating controller and a temperature indicating controller.

9. The process of claim 1 wherein said spent catalyst is recycled to said reaction zone through a recycle catalyst conduit.

* * * * *